US012720453B2

(12) United States Patent
Marr, Jr. et al.

(10) Patent No.: US 12,720,453 B2
(45) Date of Patent: Aug. 25, 2026

(54) TIME SYNCHRONIZATION IN SENSOR ARRAY SYSTEMS

(71) Applicant: CHAOS INDUSTRIES, INC., Hermosa Beach, CA (US)

(72) Inventors: Harry Bourne Marr, Jr., Manhattan Beach, CA (US); Daniel Thompson, Hermosa Beach, CA (US); Ryan Retting, Torrance, CA (US)

(73) Assignee: CHAOS INDUSTRIES, INC., Hermosa Beach, CA (US)

( * ) Notice: Subject to any disclaimer, the term of this patent is extended or adjusted under 35 U.S.C. 154(b) by 557 days.

(21) Appl. No.: 18/131,332

(22) Filed: Apr. 5, 2023

(65) Prior Publication Data

US 2024/0340818 A1 Oct. 10, 2024

(51) Int. Cl.
*H04W 56/00* (2009.01)
*H04W 84/18* (2009.01)

(52) U.S. Cl.
CPC ........ *H04W 56/0015* (2013.01); *H04W 84/18* (2013.01)

(58) Field of Classification Search
CPC .......................... H04W 56/0015; H04W 84/18
See application file for complete search history.

(56) References Cited

U.S. PATENT DOCUMENTS 7,016,381 B2 3/2006 Husain et al.
7,356,064 B2 4/2008 Husain et al.
8,411,765 B2 4/2013 Smith et al.
8,498,658 B2 7/2013 Smith et al.
8,743,976 B2 6/2014 Smith et al.
8,867,921 B2 10/2014 Smith et al.
8,989,247 B2 3/2015 Smith et al.
(Continued)

FOREIGN PATENT DOCUMENTS

EP 2705726 A1 3/2014
EP 2803217 A2 11/2014
(Continued)

OTHER PUBLICATIONS

Patent Cooperation Treaty, International Search Report and Written Opinion issued in PCT/US2024/022686, Sep. 4, 2024, pp. 1-18.

*Primary Examiner* — Walli Z Butt
(74) *Attorney, Agent, or Firm* — Pillsbury Winthrop Shaw Pittman, LLP

(57) ABSTRACT

Methods and systems are described herein for time synchronization of a distributed sensor array system ("distributed system"). The distributed system includes multiple sensor nodes which are time synchronized using status information of a sensor node (e.g., timestamp of an occurrence of an event such as receipt of a request for local timestamp, a receipt of a calibration signal). A timestamp of an occurrence of the event at a sensor node is determined for each of the sensor nodes and a time offset between a timestamp of an occurrence of the event at a reference node of the distributed system and the timestamp of the corresponding sensor node is determined. The distributed system synchronizes each of the sensor nodes based on the time offset of the corresponding sensor node to time align data signals received by the sensor nodes. The time aligned signals are cohered for further processing.

45 Claims, 10 Drawing Sheets

(56) References Cited

U.S. PATENT DOCUMENTS 9,002,138 B2 4/2015 Ranalli et al.
9,071,742 B2 6/2015 Birkbeck et al.
9,201,132 B2 12/2015 Hsu et al.
9,253,360 B2 2/2016 Birkbeck et al.
9,419,703 B2 8/2016 Smith et al.
9,453,905 B2 9/2016 Smith
9,497,722 B2 11/2016 Husain et al.
9,548,799 B2 1/2017 Hsu et al.
9,793,969 B2 10/2017 Smith et al.
9,794,903 B2 10/2017 Smith et al.
9,806,846 B2 10/2017 Smith et al.
9,921,396 B2 3/2018 Ranalli et al.
9,980,244 B2 5/2018 Smith et al.
10,021,659 B2 7/2018 Rode et al.
10,177,822 B2 1/2019 Smith et al.
2010/0226342 A1 9/2010 Colling et al.
2012/0263165 A1* 10/2012 Zakrzewski ........ H04W 56/009 370/350
2015/0109489 A1 4/2015 Saperstein et al.
2015/0281809 A1* 10/2015 Foster, III ................ H04Q 9/00 340/870.26
2016/0047894 A1 2/2016 Rode et al.
2016/0299291 A1 10/2016 Smith et al.
2017/0038456 A1 2/2017 Smith
2017/0086160 A1 3/2017 Smith et al.
2018/0020416 A1 1/2018 Smith et al.
2018/0091205 A1 3/2018 Smith et al.
2019/0028304 A1 1/2019 Rode et al.
2020/0150677 A1* 5/2020 Walters ................ G05D 1/0206
2022/0239541 A1 7/2022 Moghaddam et al.
2023/0011851 A1 1/2023 Bilstad et al.

FOREIGN PATENT DOCUMENTS

EP 2852232 A2 3/2015
EP 2984901 A1 2/2016
WO 2010042319 A2 4/2010
WO 2013106636 A2 7/2013
WO 2014168892 A1 10/2014
WO 2016137898 A1 9/2016
WO 2012151316 A1 11/2018

* cited by examiner

TIME SYNCHRONIZATION IN SENSOR ARRAY SYSTEMS

BACKGROUND

Phased array antennas have the unique ability to change the shape and direction of the radiation pattern without physically moving the antenna. Elements in an antenna array are placed in such a way that the signals transmitted by individual antennas sum up and provide better gain, directivity, and performance in a particular direction. Time synchronization may be performed between various nodes of the phased array system so that all the nodes may perform the coherent operations within the same coordinated interval of the clock. However, conventional phased array systems have some drawbacks. Some conventional phased array systems provide a time synchronization accuracy in 10s or 100s of nanoseconds, which is still a significant timing error. The synchronization accuracy may also degrade over successive hops in a network. Some of the conventional phased array systems are too expensive to implement, too large in size, consumes a significant amount of power, operate in a limited frequency range, or are more complex (e.g., have intense calibration routines that consume a significant amount of time (e.g., months)). Some conventional phase array-based radar systems are limited to detecting objects in shorter distances. These and other drawbacks exist.

SUMMARY

Methods and systems are described herein for a distributed sensor array system ("distributed system") with an improved time synchronization between sensor nodes of the distributed system. Each sensor node includes a software-defined radio (SDR) that is connected (e.g., via wired means or wirelessly) to another sensor node or component of the distributed system and facilitates time synchronization between the sensor nodes. The sensor nodes are configured to share status information with the distributed system such that any received signals or signals transmitted by the sensor nodes are calibrated and synchronized with each other to synchronize data collection across the distributed system. For example, each sensor node is synchronized with a reference node in the distributed system by computing a time offset between the sensor node and the reference node based on a timestamp of a receipt of a calibration signal at the reference node and the corresponding sensor. The data signal received at the sensor node is then "time aligned" with the data signal received at the reference node based on the time offset. The phase and amplitude of the data signal received at the sensor node may also be aligned with that of the data signal received at the reference node. The sensor nodes may use a known waveform from a transmit node in the distributed system as a calibration signal. Other known waveforms may include global positioning satellite (GPS) signal, a communication waveform from another node such as a millimeter wave, 60 GHz band, 5G, or 6G communications transmitter. The sensor nodes may also be configured using factory-calibrated atomic clocks to synchronize with each other. The sensor nodes may have the capability to self-organize (e.g., share location information such as latitude, longitude, and elevation via the status information) or self-calibrate (e.g., synchronize themselves to the reference node). For example, the distributed system may have location information of the reference node and the sensor nodes that may be used in determining a time difference in arrival of the calibration signal at the sensor nodes with respect to the reference node, which may be further be used in determining the time offset between the sensor nodes and the reference node. The sensor nodes may self-calibrate using factory-calibrated atomic clocks, the calibration signal or other known waveforms on a scheduled basis, prior to transmitting a probe signal, or prior to receiving a response to the probe signal.

Such a distributed system solves various problems of the conventional phased array systems. For example, by having the sensor nodes synchronize with a reference node in the distributed system, the synchronization accuracy is improved significantly (e.g., with an accuracy of better than less than a nanosecond timing error) compared to the conventional phased array systems. In another example, by having the sensor nodes self-calibrate, the problem of intense calibration routines that could take months in the conventional phased array systems every time temperature, pressure, moisture, location of phased array changes is solved. In another example, by having each of the sensor nodes synchronize with the reference node, all sensor nodes are one hop away from the reference node, and therefore, the time synchronization does not degrade with scaling of the distributed system. In some embodiments, by having the sensor nodes and the transmit node self-organize, the transmit node need not be co-located with the sensor nodes and therefore, the problem of the transmitter exposing the location of a base station/operator/receiver (e.g., in surveillance applications, such as radar systems) is prevented. In some embodiments, by having a SDR, the distributed system could be configured to work at wide variety of frequency ranges (e.g., low frequency) range, that not only helps in ultra-long range and high-speed radar detecting and sensing applications, but also minimizes a size of the required phased array systems, which otherwise would have been very large or infeasible to implement for low frequency operations.

Such a distributed system has various advantages. The distributed system facilitates detection of hypersonic airborne objects much better without having to alias the doppler signal in. The distributed system detects airborne objects at much longer range than conventional radar systems, especially for a given volume (the distributed system occupies lesser volume, weighs lesser, consumes lesser power than the conventional phased array systems). The distributed system is significantly less expensive and faster to deploy than the conventional phased array systems. The distributed systems allows the receivers (e.g., the sensor nodes) and the transmitter node to be very distant and not co-located (e.g., transmitted may be in motion too) such that the transmitter doesn't give away the receiver's location solving the counter stealth problem. The distributed system provides better angular resolution for a given frequency than the conventional phased array systems because the sensor nodes can be spaced out much further. The distributed system provides a new "pass through" radar capability where the receiver may be directly in line with the transmission and doesn't depend on a reflection. The distributed system may also be implemented for taking temperature, spectroscopy, medical measurements like blood/oxygen levels, or any other type of data collection and then combining the synchronized data sets.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a." "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form to avoid unnecessarily obscuring the embodiments of the invention.

Figure 1:
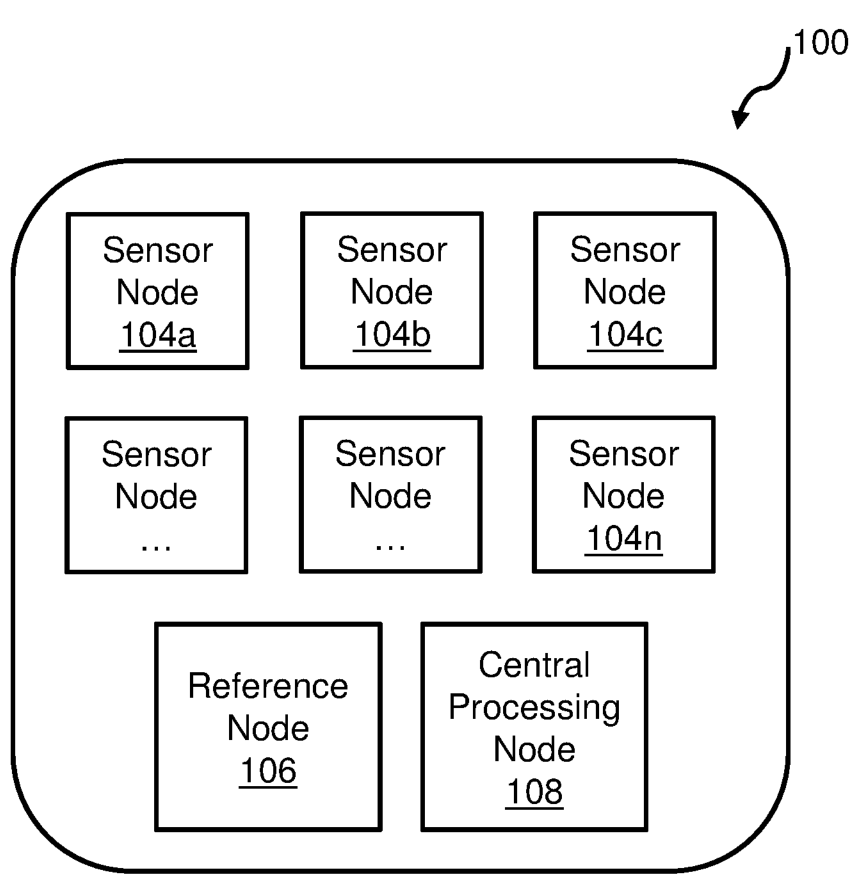
FIG. 1 shows a distributed sensor array system, consistent with various embodiments.

FIG. 1 shows a distributed sensor array system 100, consistent with various embodiments. For example, the distributed sensor array system ("distributed system") 100 may include several sensor nodes 104*a*-104*n* that facilitate transmission of waveforms as beams in a desired direction. In some embodiments, the distributed system 100 is a phased array system. The sensor nodes include a software defined radio (SDR) that is configured to operate in a wide range of radio frequencies (e.g., 1 Hz to 300 GHz). The distributed system 100 may be implemented for various applications. For example, the distributed system 100 may be implemented for surveillance as a radar system, a sonar system, in oil and gas industry for finding energy, in mining industry for finding metals, etc. The following paragraphs describe the distributed system 100 configured for transmission and reception of radio frequency (RF) waveforms, but the distributed system 100 is not limited to working with RF waveforms and may be configured to work with other waveforms as well (e.g., acoustic waves, seismic waves, etc.).

A sensor node may be configured to be only one of (a) a transmit only sensor node in which case it may transmit waveforms but not receive waveforms, (b) a receive only sensor node in which case it may receive waveforms but not transmit waveforms, or (c) both transmit and receive sensor node in which case it may transmit or receive waveforms. Unless stated otherwise, a sensor node may be both a transmit and receive sensor node. Each of the sensor nodes 104*a*-104*n* may be configured to transmit an outgoing waveform (e.g., referred to as a "probe signal") that may all combine together to form a beam in a particular direction. Each of the sensor nodes 104*a*-104*n* may receive a response to the probe signal (e.g., referred to as a "data signal") that may be "time aligned" and cohered by the distributed system 100 for further processing (e.g., by a third-party system) for one or more applications.

The distributed system 100 time synchronizes the sensor nodes 104*a*-104*n* to time align the transmitted probe signals or the data signals received by the sensor nodes. In some embodiments, time aligning the data signals includes applying at least one of a time offset, phase, or amplitude to the data signals such that the data signals of all sensor nodes 104*a*-104*n* have the same time offset, phase and amplitude. The distributed system 100 may synchronize the sensor nodes 104*a*-104*n* in several ways. In one example, each sensor node may have their own local clock (e.g., a quartz oscillator) and the local clock may be synchronized with a phase lock loop, which is synchronized with an external signal such as (a) an external clock signal that is wired to each receiver, or (b) a wireless external signal such as a GPS signal, an astrological signal (e.g., a quasar signal, the cosmic microwave background signals or other signals from radio astronomy), waveforms from television towers, acoustic waveform, or a calibration signal from a transmitter node in the distributed system 100 (additional details of which are described below). In another example, each sensor node's local clock may be made up of an atomic clock with a low drift (e.g., that may not drift more than a microsecond over the period of days or even months), where the atomic clock for each sensor node may be synchronized and aligned at the factory before the sensor nodes are deployed.

In some embodiments, each of the sensor nodes 104*a*-104*n* shares status information with the distributed system 100 (e.g., one or more other sensor nodes) such that any received signals or signals transmitted by the sensor nodes are calibrated and synchronized with each other to synchronize data collection across the distributed system 100. The status information may include, temperature in an environment of the sensor node; location (such as determined by GPS) of the sensor node; calibration metrics such as phase and amplitude offsets of the RF components (or optical components in the case of optics); or a timestamp of an occurrence of an event such as (a) a receipt of a signal (e.g., calibration signal, GPS signal, or any other known waveform) or (b) a receipt of a request for local timestamp of the sensor node. In some embodiments, the distributed system 100 synchronizes each of the sensor nodes 104*a*-104*n* with a reference node 106 of the distributed system 100 by computing a time offset between a timestamp of an occurrence of the event at a reference node 106 of the distributed system 100 and a timestamp of an occurrence of the event at the corresponding sensor node. For example, in the event the sensor nodes 104*a*-104*n* are implemented using factory-calibrated atomic clocks, a sensor node of the distributed system 100 (e.g., a central processing node 108) sends a request to each of the sensor nodes 104*a*-104*n*, including a reference node 106 of the distributed system 100, for a local timestamp of the corresponding sensor node and obtains a response including the local timestamp (e.g., a time at which the request is received at the corresponding sensor node). The distributed system 100 synchronizes a first sensor node 104*a* with the reference node 106 by computing a time offset between a reference timestamp of the reference node 106 and a first timestamp of the first sensor node 104*a*.

In another example where the distributed system 100 is configured to synchronize the sensor nodes 104*a*-104*n* using a calibration signal, the distributed system 100 synchronizes each of the sensor nodes 104*a*-104*n* with a reference node 106 of the distributed system 100 by computing a time offset between a timestamp of a receipt of a calibration signal at a reference node 106 of the distributed system 100 and a timestamp of receipt of the calibration signal at the corresponding sensor node. For example, the distributed system 100 synchronizes a first sensor node 104*a* with the reference node 106 by computing a time offset between a timestamp of a receipt of a calibration signal at the reference node 106 and a first timestamp of receipt of the calibration signal at the first sensor node 104*a*.

When a probe signal is transmitted or a data signal is received by the sensor nodes 104*a*-104*n*, the distributed system 100 (e.g., a central processing node 108) may apply the corresponding time offsets to the probe signals or the data signals of the sensor nodes 104*a*-104*n* to generate time aligned data signal for each of the sensor nodes 104*a*-104*n*. Additional details with respect to time synchronization of the sensor nodes 104*a*-104*n* are described at least with reference to FIGS. 3-5 below.

After the data signals are time aligned, the distributed system 100 coheres the time aligned data signals to generate a combined data signal with a coherent gain such that power level of the combined signal may be a function of the individual time aligned signals being combined. For example, the power level of the cohered signal is a sum of the power levels of the individual time aligned signals of the different sensor nodes. In another example, the power level of the cohered signal is greater than the power levels of any of the individual time aligned signals of the different sensor nodes. In some embodiments, the data signals are cohered by adding the time domain signals together from the different sensor nodes 104*a*-104*n* such that the data signals are time aligned and coherently added together. The cohered signal may then be intelligently signal processed by the distributed system 100, or provided to a third-party system, for one or more applications. One such application may include a surveillance application, such as a radar system to determine one or more parameters of an object (e.g., speed and distance of an aircraft) in an environment of the distributed system 100. Another application may include detection of radar pulses. Another application may include digital receive beamforming.

In some embodiments, one of the sensor nodes 104*a*-104*n* is designated as a reference node 106, whose clock acts as a reference clock for synchronizing the clocks of the other sensor nodes 104*a*-104*n*. In some embodiments, a central processing node 108 is one of the sensor nodes 104*a*-104*n* that is configured to perform various types of processing, such as computing time offsets, generating time aligned data signals, cohering time aligned data signals, etc. In some embodiments, the central processing node 108 and the reference node 106 are the same sensor node.

In some embodiments, the sensor nodes 104*a*-104*n* may operate independent of each other, may not be physically connected to one another as they can communicate with other entities of the distributed system 100 wirelessly, which enables the distributed system 100 to be not only easily scalable but also to be configured to operate at low frequencies for ultra-long range and high-speed detection while keeping the size the distributed system 100 to minimum, which is a significant advantage over conventional phased array systems. The conventional phased array systems would have been very large or infeasible to implement for low frequency operations as the size of the antenna is inversely proportional to the transmission/reception frequency, and the circuit boards that would house such antennas would be significantly large that is either difficult or infeasible to manufacture. In the distributed system 100, the sensor nodes 104*a*-104*n* can be spaced $\lambda/2$ (where $\lambda$ is wavelength of the signal) distance units apart from each other. For example, if the frequency of the waveform transmitted by the sensor nodes 104*a*-104*n* is 50 MHZ, which corresponds to a wavelength of approximately 6 meters, the sensor nodes 104*a*-104*n* may be placed approximately "3" meters apart from each other. The sensor nodes 104*a*-104*n*, including the reference node 106 and the central processing node 108, may be co-located (e.g., located within a specified number of wavelengths of the operating frequency) or may be remotely located (e.g., located beyond the specified number of wavelengths of the operating frequency). For example, the first sensor node 104*a* and the second sensor node 104*b* may be co-located, while the reference node 106 may be remotely located. In another example, the first sensor node 104*a* and the second sensor node 104*b* may be co-located, while a third sensor node 104*c* may be remotely located. Regardless of how the sensor nodes 104*a*-104*n* are located, the sensor nodes 104*a*-104*n* may be synchronized as long as the location information of the sensor nodes 104*a*-104*n*, the reference node 106 or the central processing node 108 is available. For example, as mentioned above, the sensor nodes 104*a*-104*n* may have the capability to self-organize (e.g., share location information such as latitude, longitude, and elevation via the status information) or self-calibrate (e.g., synchronize themselves to the reference node 106). The distributed system 100 may have location information of the reference node 106 and sensor nodes 104*a*-104*n* that may be used in determining a time difference in arrival of the calibration signal at the sensor nodes with respect to the reference node 106, which may be further be used in determining the time offset between the sensor nodes 104*a*-104*n* and the reference node 106. The sensor nodes may self-calibrate using the factory-calibrated atomic clocks, the calibration signal or other known waveforms on a scheduled basis, prior to transmitting a probe signal, or prior to receiving a response to the probe signal.

The distributed system 100 may be easily scaled up or scaled down by adding or removing sensor nodes, respectively. Furthermore, since each sensor node 104*a*-104*n* may communicate with the reference node 106 or the central processing node 108 directly, all the sensor nodes 104*a*-104*n* are a single hop away from the reference node 106 or the central processing node 108, and any scaling of the distributed system 100 may not result in degradation of the time synchronization accuracy. In some embodiments, by having the sensor nodes distributed widely in space, interferometry data between the sensor nodes may be done and accurate angle accuracy may be obtained even at low frequencies.

While FIG. 1 shows a single cluster of sensor nodes 104*a*-104*n*, the distributed system 100 may have several clusters in which each cluster may have several sensor nodes. Different clusters may have different number of sensor nodes or the same number of sensor nodes. In some embodiments, such a configuration enables detection of a moving object at ultra-long range and hypersonic speeds; better angle resolution than available with a single cluster. Also, some clusters may remain completely passive making the location of the cluster difficult to impossible to ascertain since no active transmissions. Yet another advantage of having multiple clusters may be that one cluster could be significantly closer in distance to the received signal and this suffers much less free space path loss of the signal and thus, get a much stronger signal to share between nodes. In some embodiments, the clusters may be spread over a few hundred meters. Each cluster may generate a cohered signal from the time aligned signals of its constituent sensor nodes and the cohered signal from all the clusters may be further cohered to generate a master cohered signal with a coherent gain such that the power level of the master cohered signal is a function of the power levels of the constituent cohered signals of the different clusters. For example, the power level of the master cohered signal is a sum of the power levels of the constituent cohered signals of the different clusters. In another example, the power level of the master cohered signal is greater than the power levels of any of the constituent cohered signals of the different clusters.

Figure 2:
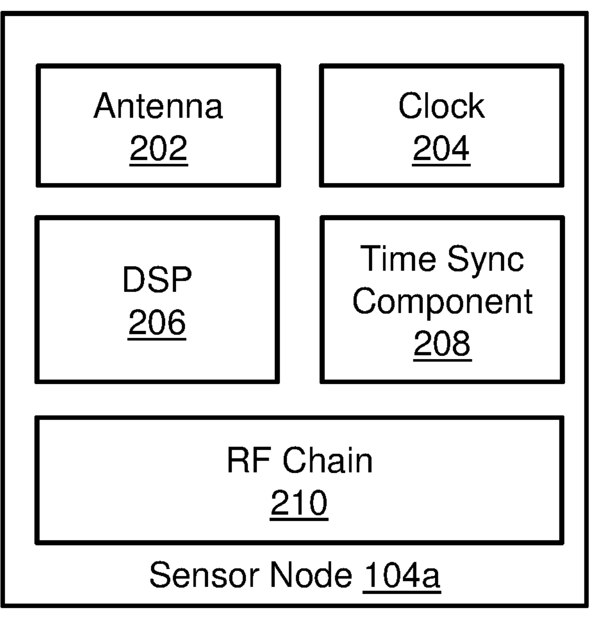
FIG. 2 is a block diagram of a sensor node of a distributed system of FIG. 1, consistent with various embodiments.

FIG. 2 is a block diagram of a sensor node of a distributed system of FIG. 1, consistent with various embodiments. A sensor node (e.g., first sensor node 104*a*) includes an antenna 202 that facilitates radiation or reception of waveforms when connected to a transmitter or receiver (not illustrated). The antenna 202 may be configured to transmit or receive waveforms of a wide range of frequencies. The first sensor node 104*a* may include a clock 204 that generates a clock signal for use in synchronizing the operations (e.g., coordinate sequence of actions) of the first sensor node 104*a*. The clock 204 may be a quartz clock, an atomic clock, or another type of clock.

The first sensor node 104*a*-104*n* may include a time synchronization component 208 that synchronizes the clock 204 of the first sensor node 104*a* in any of a number of ways mentioned above. For example, the time synchronization component 208 synchronizes the clock 204 with an external signal such as an external clock signal that is wired to the first sensor node 104*a* or a wireless external signal such as a GPS signal or an astrological signal. In another example, the time synchronization component 208 synchronizes the clock 204 to a clock of the reference node 106 using a calibration signal from a transmitter node (additional details of which are described at least with reference to FIGS. 3-5 below).

The first sensor node 104*a* includes a digital signal processor (DSP) 206 that is configured to perform various signal processing operations including generating time aligned signals, match filtering received calibration signals or data signals, setting a frequency range of the first sensor node 104*a*, radar signal processing, etc.

The first sensor node 104*a* includes an RF chain 210. In some embodiments, the RF chain 210 may be a cascade of electronic components and sub-units which may include any of amplifiers, filters, mixers, attenuators, and detectors. All these components may be combined to serve a specific application (e.g., a radar system for detection of moving objects). One or more of the components (e.g., the DSP 206 and time synchronization component 208) may be implemented using an SDR. The SDR facilitates various functionalities. For example, the SDR may facilitate obtaining of location information of the sensor nodes 104*a*-104*n*, the reference node 106 or the central processing node 108 (e.g., using a GPS). In another example, the SDR may facilitate in the generation of time aligned data signals.

Note that one or more components of the first sensor node 104*a* may be communicatively coupled to another device of the distributed system 100 via a communication module to coordinate its operations. Some or all of the components of the first sensor node 104*a* may be combined as one component. A single component may also be divided into sub-components, each sub-component performing separate method step or method steps of the single component. Any one or more of the components described herein may be implemented using hardware (e.g., a processor of a machine) or a combination of hardware and software. For example, any component described herein may configure a processor to perform the operations described herein for that component.

Figure 3:
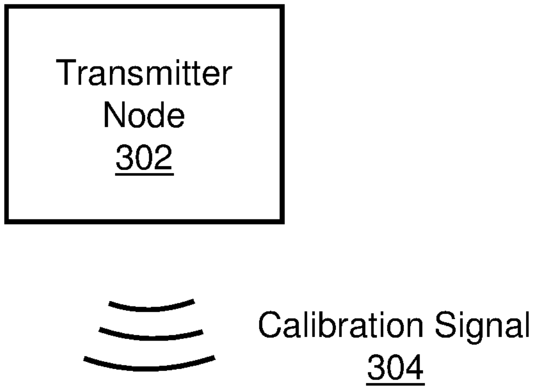
FIG. 3 shows an example of synchronizing the sensor nodes using a calibration signal from a transmitter node of the distributed system of FIG. 1, consistent with various embodiments.
Figure 3:
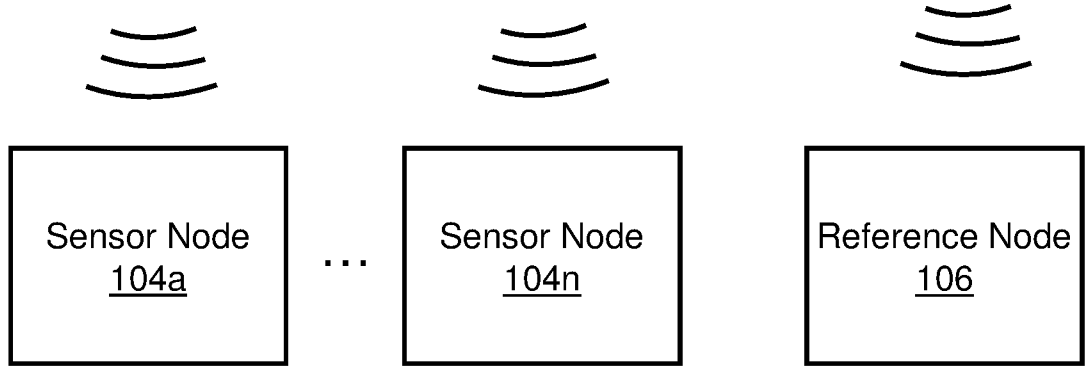

FIG. 3 shows an example of synchronizing the sensor nodes 104*a*-104*n* using a calibration signal 304 from a transmitter node 302 of the distributed system 100. The calibration signal 304 may be any of a wide range of frequencies (e.g., 50 MHz, 144 MHZ, 30 GHZ, etc.). While FIGS. 3-5 below show an example of time synchronization using a calibration signal from a transmitter, note that the time synchronization is not limited to being performed using a calibration signal, it can be performed in a number of ways as mentioned above at least with reference to FIG. 1. For example, the sensor nodes 104*a*-104*n* may be time synchronized using an external wireless signal such as a calibration signal 304 that is of a known waveform, such as a GPS signal, an astrological signal, seismic signal, acoustic signal, a signal transmitted from a transmitter (e.g., signal from television towers), or a signal transmitted from a transmitter node of the distributed system 100. In another example, time synchronization may be achieved by using factory-calibrated atomic clocks in the sensor nodes 104*a*-104*n*. Further, note that while FIGS. 3-5 discuss time synchronization with reference to a data signal being received by the sensor nodes 104*a*-104*n*, the concept of time synchronization is not limited to the data signals received by the sensor nodes, it is applicable to the probe signals transmitted by the sensor nodes as well.

FIG. 3 is a block diagram of time synchronization of sensor nodes in the distributed system of FIG. 1, consistent with various embodiments. The transmitter node 302 may be co-located with the sensor nodes 104*a*-104*n* or may be remotely located. In some embodiments, the transmitter node 302 is considered to be co-located with the sensor nodes 104*a*-104*n* if the transmitter node 302 is within a specified proximity (e.g., a specified number of wavelengths of the calibration signal 304) of the sensor nodes 104*a*-104*n*. For example, if the transmitter node 302 frequency of transmission is 144 MHZ, then the transmitter node 302 is considered to co-located with the sensor nodes 104*a*-104*n* if it is within "20"-"50" meters of any of the sensor nodes 104*a*-104*n*. If the transmitter node 302 is beyond the specified proximity (e.g., beyond 50 m for 144 MHz frequency) of the sensor nodes 104*a*-104*n*, then the transmitter node 302 is considered to be remotely located. In some embodiments, the transmitter node 302 can even be located beyond the horizon in the case where the transmitter is quite powerful (e.g., hundreds or thousands of watts per transmit power amp with multiple transmit antennas that create a transmit phased array, and where the transmit frequency is at 50 MHZ). Further yet, the transmitter node 302 may also be configured to be mobile, in motion or moving. In some embodiments, by having the transmitter node 302 being remotely located with respect to the sensor nodes, and being in motion, a "no probability of detection" sensor system may be established (e.g., because the transmitter node 302 is not co-located with the receiver sensor nodes, an adversary may not geo-locate the receiver sensor nodes by using the transmitter signal).

Regardless of whether the transmitter node 302 is co-located or remotely located, the transmitter node 302 is located in a known location relative to the sensor nodes 104*a*-104*n*, and the calibration signal 304 may be "seen" (e.g., calibration signal 304 is above the noise) or received by the sensor nodes 104*a*-104*n* without the need for signal processing. For example, the distributed system 100 may know the location information (e.g., latitude, longitude information) of the transmitter node 302. Such a configuration provides the flexibility of having the transmitter node 302 at any of various locations, and also eliminates the need for the sensor nodes 104*a*-104*n* to be in line of sight with each other.

Each of the sensor nodes 104*a*-104*n*, including the reference node 106, receives the calibration signal 304 and determines a timestamp of the receipt of the calibration signal 304. The distributed system 100 computes the time offsets of the sensor nodes 104*a*-104*n* based on the timestamps of the sensor nodes 104*a*-104*n* and the timestamp of the reference node 106 to synchronize the sensor nodes 104*a*-104*n* with respect to the reference node 106. Additional details of synchronizing the sensor nodes 104*a*-104*n* with respect to a reference node in the distributed system using a calibration signal from a transmitter node are described in more detail with respect to FIGS. 4-5 below.

Example Flowchart(s)

The example flowchart(s) described herein of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

Figure 4:
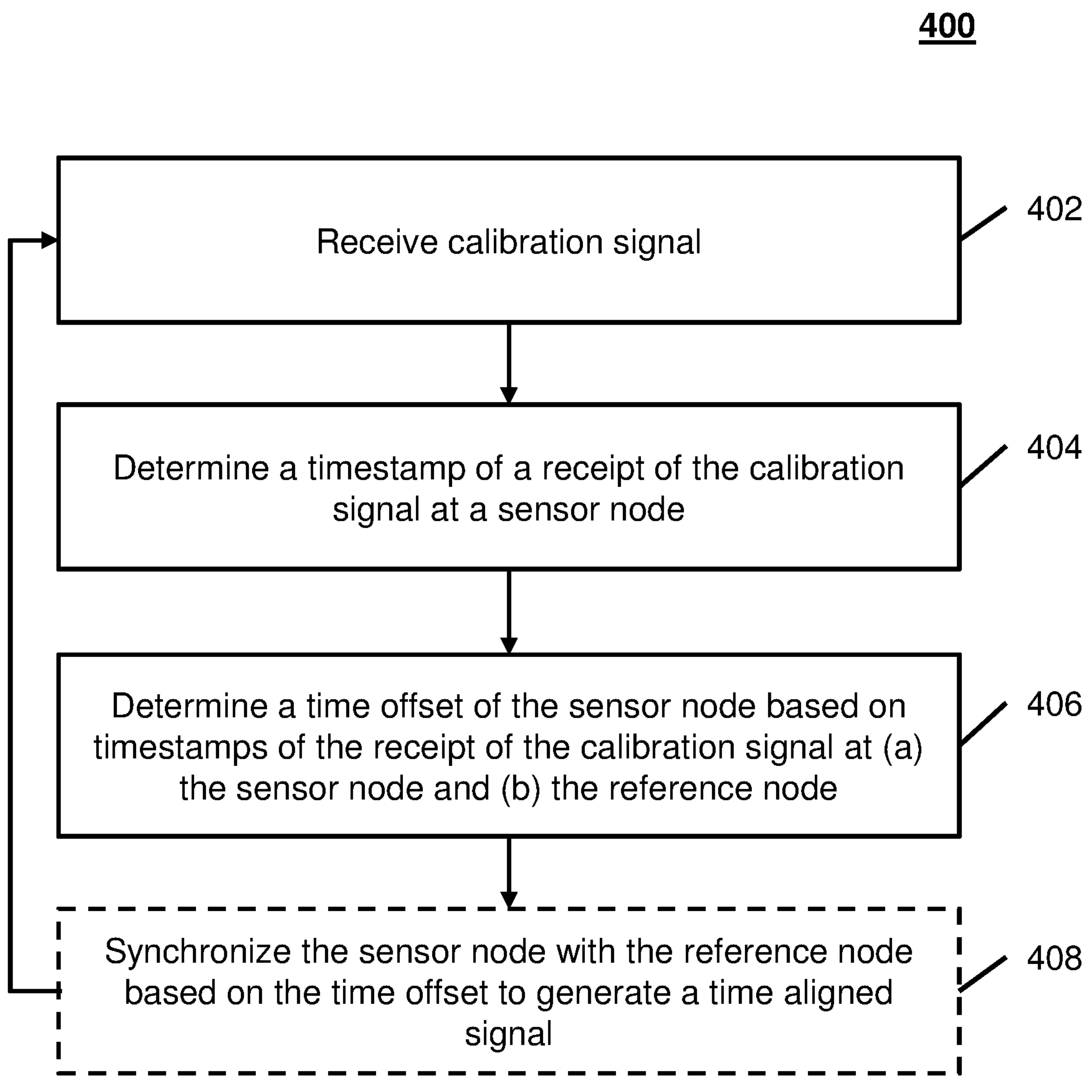
FIG. 4 shows a flowchart of a method for synchronizing sensor nodes in a distributed system, consistent with various embodiments.

FIG. 4 shows a flowchart of a method 400 for synchronizing sensor nodes in a distributed system, consistent with various embodiments. The method 400 is one example of synchronizing sensor nodes in which the sensor nodes 104*a*-104*n* are synchronized with respect to a reference node in the distributed system using a calibration signal from a transmitter node. In some embodiments, the method 400 may be implemented in a sensor node, a reference node, or a central processing node of the distributed system 100. In an operation 402, a calibration signal from a transmitter node is received at each of the sensor nodes (e.g., receive sensor nodes), including a reference node. For example, a first sensor node 104*a*, a second sensor node 104*b* and a reference node 106 of the distributed system receives the calibration signal 304 from the transmitter node 302 (e.g., as described at least with reference to FIG. 3 above).

In an operation 404, a timestamp of a receipt of the calibration signal is determined by each of the sensor nodes 104*a*-104*n* (e.g., receive sensor nodes) and the reference node. For example, the first sensor node 104*a* determines a first timestamp of a receipt of the calibration signal 304 (e.g., based on the clock of the first sensor node 104*a*), the second sensor node 104*b* determines a second timestamp of a receipt of the calibration signal 304, and the reference node 106 determines a reference timestamp of a receipt of the calibration signal 304.

In some embodiments, the calibration signal 304 may be a transmit pulse of a specified duration (e.g., 10 to 1,000 microseconds long), in which case a sensor node may compress the receive timestamp into a single point of time. A signal may be compressed into a single point of time in a number of ways. For example, the first sensor node 104*a*-104*n* may use a matched filter (e.g., matched filter algorithm) to compress the calibration signal into a single point of time.

In an operation 406, a time offset of the sensor nodes with respect to the reference node is computed based on the timestamps of the receipt of the calibration signal at the corresponding sensor nodes 104*a*-104*n* (e.g., receive sensor nodes) and the timestamp of the receipt of the calibration signal at the reference node. In some embodiments, the time offset may be computed by a central processing node 108. The sensor nodes 104*a*-104*n* and the reference node 106 may transmit their corresponding timestamps to the central processing node 108, which may compute the timestamps. For example, consider that the reference timestamp of a receipt of the calibration signal 304 recorded by the reference node 106 is "1.00" nanoseconds, the first timestamp of a receipt of the calibration signal 304 recorded by the first sensor node 104*a* is "1.05" nanoseconds, and the second timestamp of a receipt of the calibration signal 304 recorded by the second sensor node 104*b* is "0.98" nanoseconds. The reference node 106, first sensor node 104*a* and second sensor node 104*b* transmit their corresponding timestamps to the central processing node 108. The central processing node 108 computes a first time offset for the first sensor node 104*a* by subtracting the reference timestamp ("1.00") from the first timestamp (e.g., "1.05") to obtain the first time offset (e.g., "1.05"−"1.00"="0.05" nanoseconds). Similarly, the central processing node 108 computes a second time offset for the second sensor node 104*b* by subtracting the reference timestamp ("1.00") from the second timestamp (e.g., "0.98") to obtain the second time offset (e.g., "0.98"−"1.00"="−0.02" nanoseconds). In some embodiments, the central processing node 108 may store these time offsets in a storage device (not illustrated) so that in the future when it receives data signals data from the first and second sensor nodes, the two sensor nodes may be synchronized by applying the corresponding time offsets to the data signals to generate time aligned data signals.

In some embodiments, the central processing node 108 may also consider time difference of arrival of the calibration signal 304 from the transmitter node 302 to the different sensor nodes 104*a*-104*n* for computing the time offsets. In some embodiments, the time difference in arrival is indicative of a difference between a time at which the calibration signal arrived at a specific sensor node and a time at which the calibration signal arrived at the reference node 106. If all the sensor nodes 104*a*-104*n* are co-located (e.g., within specified number of wavelengths of the calibration signal 304), the time difference of arrival of the speed of light is negligible, and so the time difference of arrival may also be negligible, and therefore, time difference of arrival calculation may not be necessary and computing the time offset based on the time stamps may be accurate. However, if the sensor nodes 104*a*-104*n* are not co-located (e.g., located beyond the specified number of wavelengths of the calibration signal 304), the time difference of arrival of the calibration signal 304 from the transmitter node 302 to the sensor nodes 104*a*-104*n* may also be calculated such that a sum of the time offset, the time difference of arrival and the timestamp are the same for all the sensor nodes 104*a*-104*n*. The time difference of arrival may be computed based on speed of light and the known location information of the transmitter node 302 or sensor nodes 104*a*-104*n*. As an example, if two nodes are exactly co-located but have a time difference of arrival of a calibration signal by 1 microsecond, then the time offset would be adjusted by 1 microsecond. On the other hand, if the sensor nodes are located 100 meters a part in the direction which the calibration/reference signal is travelling, equating to "333" nanoseconds at the speed of light. So, if the time difference of the signal arriving at the further node is "1,333" nanoseconds after the first/reference node, then the time offset would only be 1 microsecond to account for the distance offset.

Figure 5A:
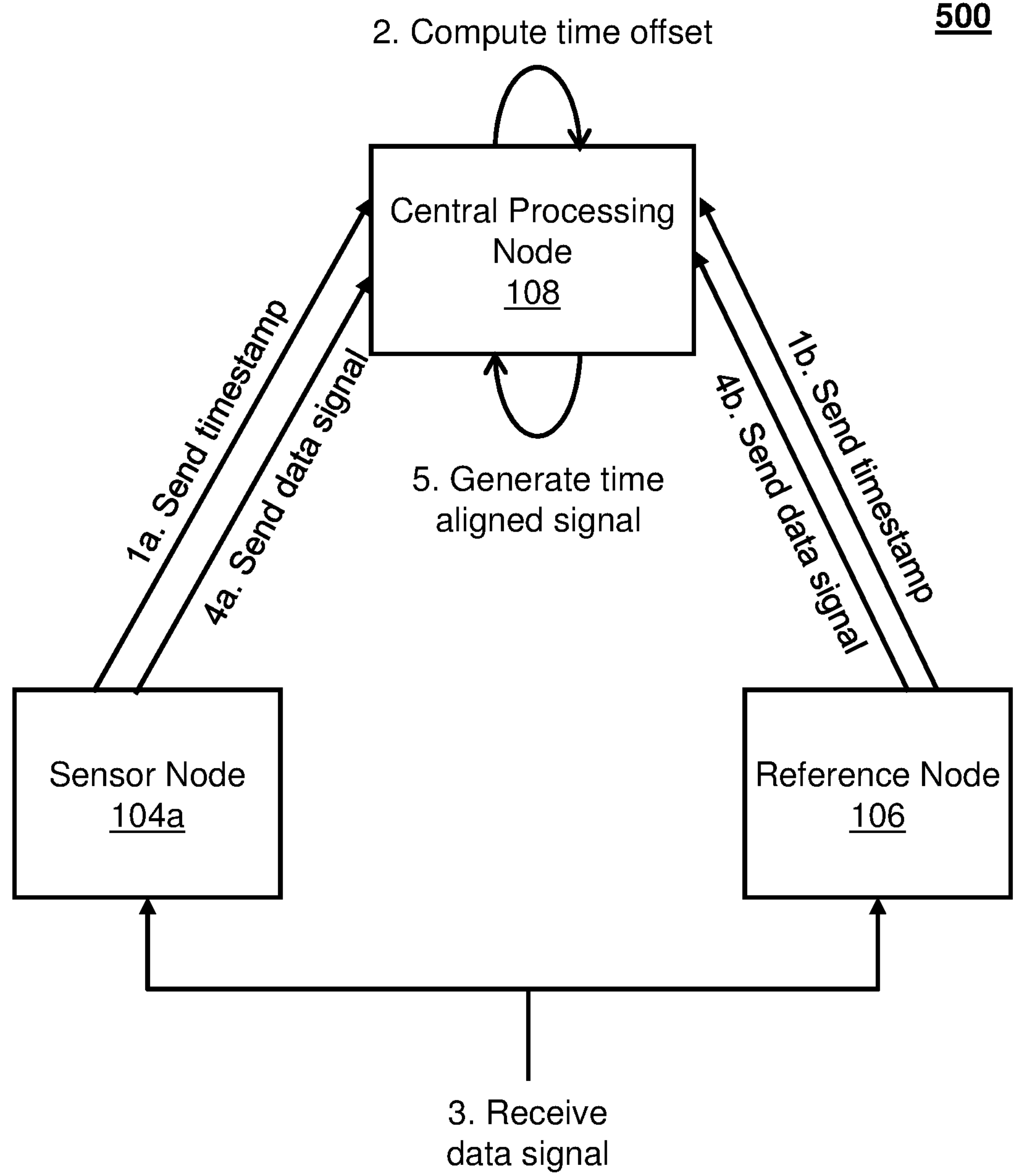
FIGS. 5A, 5B and 5C are block diagrams illustrating generation of time aligned data signals for the sensor nodes of the distributed system, consistent with various embodiments.
Figure 5B:
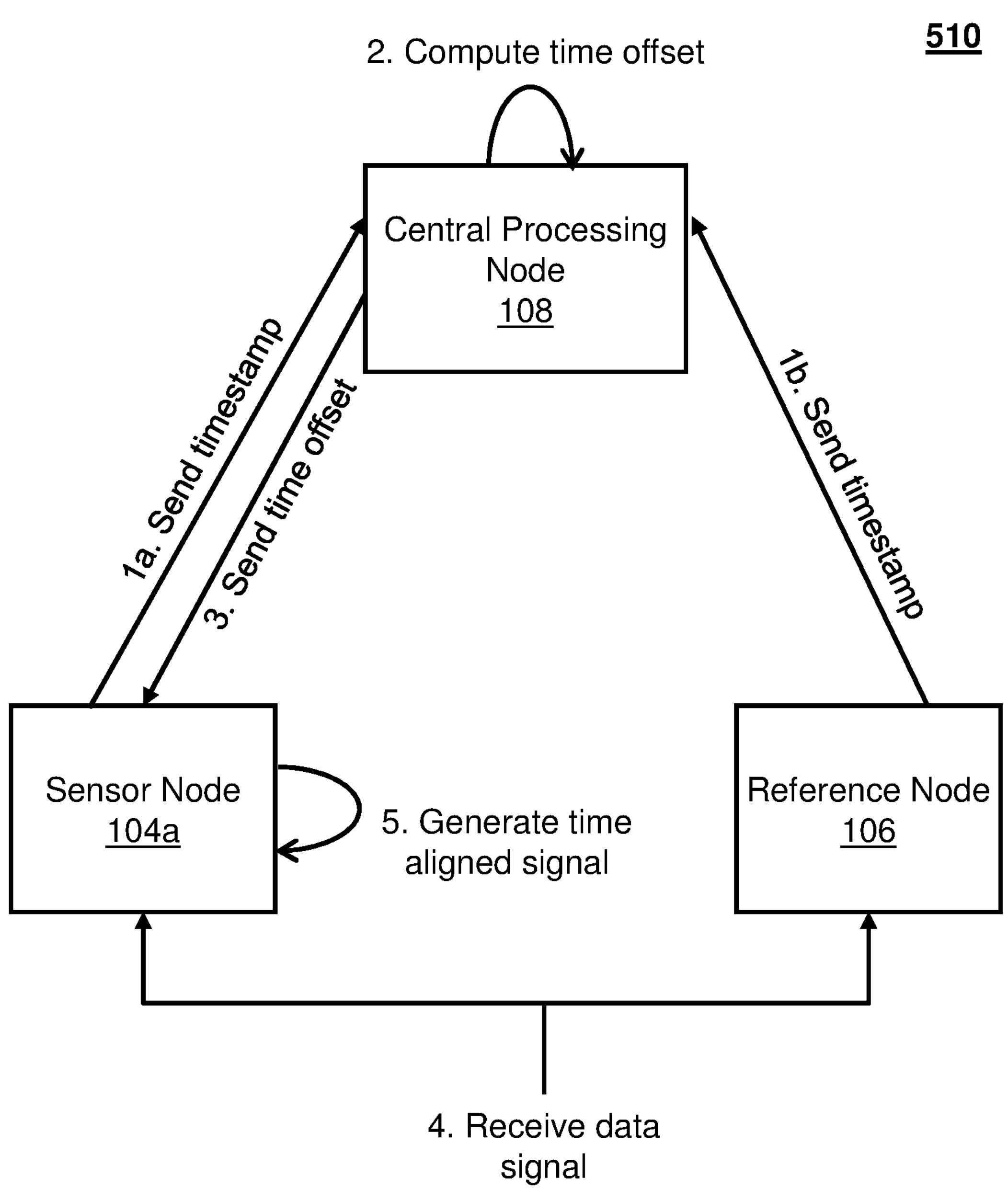
Figure 5C:
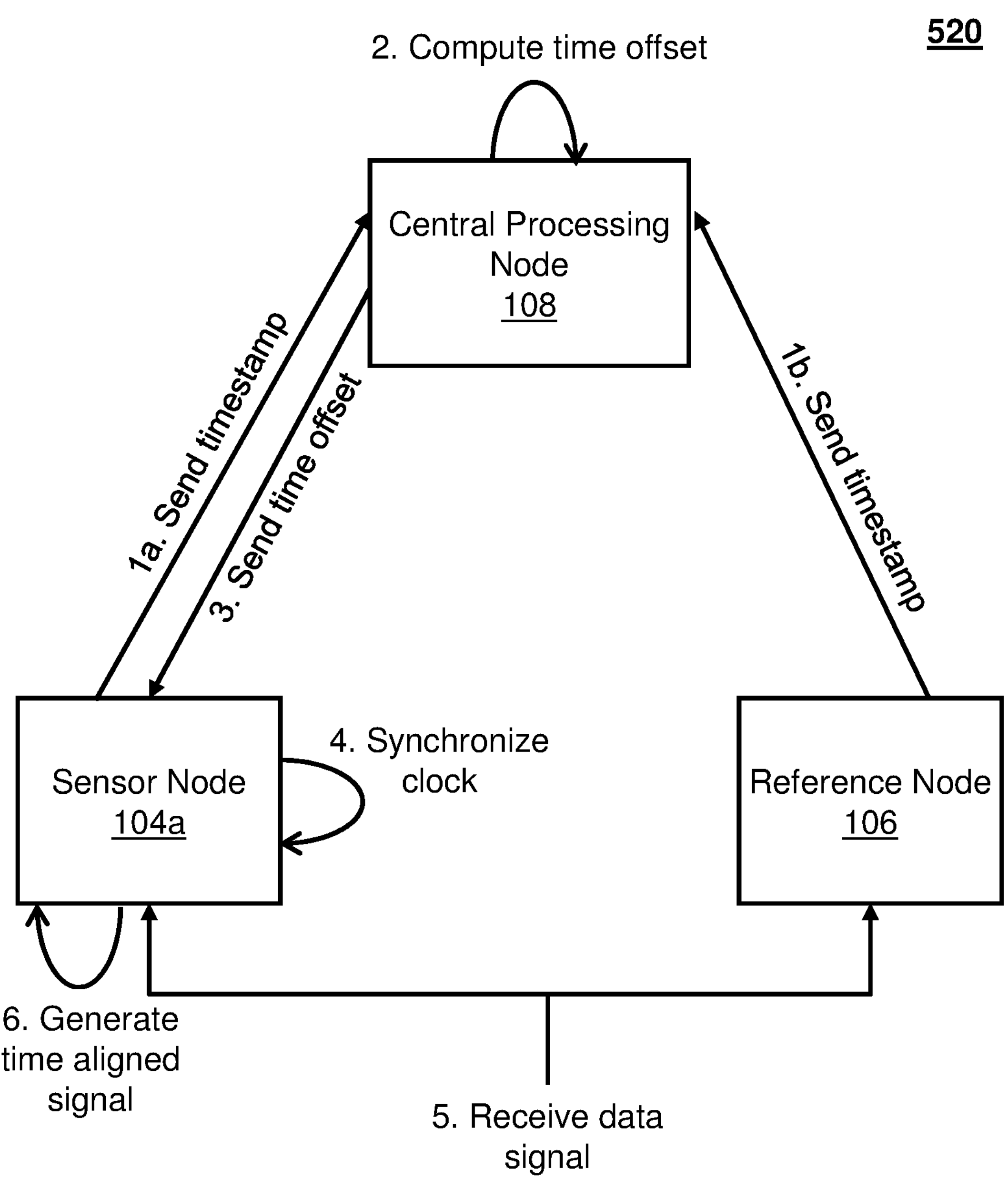

In an operation 408, the sensor nodes 104*a*-104*n* are synchronized based at least on the time offsets to generate a time aligned data signal for each of the sensor nodes 104*a*-104*n*. In some embodiments, a time aligned signal is a data signal that is aligned in time (e.g., and phase or amplitude) with the data signal received by other sensor nodes (e.g., the reference node 106). The time aligned data signals may be generated in various ways. FIGS. 5A-5C are block diagrams illustrating generation of time aligned data signals for the sensor nodes of the distributed system, consistent with various embodiments.

In a first example 500 illustrated in FIG. 5A, all the sensor nodes 104*a*-104*n* (e.g., sensor nodes with receiving capability), such as the first sensor node 104*a*, and the reference node 106 transmit their timestamps of receipt of the calibration signal to the central processing node 108. For example, the first sensor node 104*a* transmits the first timestamp (e.g., "1.05" nanoseconds) and the reference node 106 transmits the reference timestamp (e.g., "1.00" nanoseconds) to the central processing node 108. Note that in the example of FIGS. 5A-5C, the reference node 106 and the central processing node 108 are shown as separate nodes. However, in other embodiments, the reference node 106 and the central processing node 108 may be the same sensor node. After receiving the timestamps, the central processing node 108 computes the first time offset for the first sensor node 104*a* as a difference between the first timestamp and the reference timestamp (e.g., "1.05"–"1.00"="0.05" nanoseconds). Similarly, the central processing node 108 computes the second time offset for the second sensor node 104*b* (not illustrated in FIG. 5A) as a difference between the second timestamp and the reference timestamp (e.g., "0.98"-"1.00"="–0.02" nanoseconds). The central processing node 108 may further store the first and second time offsets in a storage device (not illustrated) associated with the central processing node 108. When the sensor nodes and the reference node receive a data signal (e.g., a response to a probe signal transmitted by the sensor nodes and that is reflected off by an object such as an aircraft), the sensor nodes and the reference node transmit the received data signal to the central processing node 108. For example, the first sensor node 104*a* and the reference node 106 transmit the received first data signal and a reference data signal, respectively, to the central processing node 108. The central processing node 108 may then retrieve the first time offset from the storage device and apply it to the first data signal to generate a first time aligned data signal of the first sensor node 104*a*. Similarly, the central processing node 108 may apply the second time offset to the second data signal of the second sensor node 104*b* to generate a second time aligned data signal of the second sensor node 104*b*.

In some embodiments, generating a time aligned data signal may include equalizing the data signals received by the sensor nodes. Equalizing may be a process of adjusting at least one of phase, amplitude, and time offsets of data signals such that the received waveform at all sensor nodes have the same amplitude, phase and time offset characteristics. For example, equalizing the first data signal received by the first sensor node may include adjusting at least one of a phase, time or amplitude such that the first data signal is aligned in time, phase or amplitude with a data signal received by another node (e.g., the reference node). In some embodiments, only one of time offset, phase adjustment or amplitude adjustment may be applied to equalize the received data signals. Amplitude, phase, and time delay differences between the signals create errors in the beamforming and cohering the signals causing degradation in the coherent "gain." By equalizing the received data signals, the errors in the gain and beamforming pattern are minimized. Equalization may be performed via a finite impulse response (FIR) filter or an infinite impulse response (IIR) filter. In some embodiments, equalization is performed via the FIR. In some embodiments, the same FIR is used across multiple data signals thereby minimizing computing resources consumed in equalizing the data signals, unlike conventional systems where a FIR filter may be used for each received signal which can be compute intensive.

Accordingly, the central processing node 108 may generate the time aligned data signals by equalizing the received data signals as illustrated in the first example 500 of FIG. 5A.

In a second example 510 of FIG. 5B, each of the sensor nodes may generate their own time aligned data signal based on the time offset computed by the central processing node 108. For example, the first sensor node 104*a* and the reference node 106 transmit the first timestamp and the reference timestamp, respectively, to the central processing node 108. The central processing node 108 computes the first time offset of the first sensor node 104*a* based on the first timestamp and the reference timestamp (e.g., as described above at least with reference to FIG. 5A) and transmits the first time offset to the first sensor node 104*a*. When the sensor nodes receive a data signal (e.g., a response to a probe signal transmitted by the sensor nodes, the response being reflected off an object such as an aircraft), the sensor nodes generate time aligned signals based on their received time offsets. For example, when the first sensor node 104*a* receives the first data signal, the first sensor node 104*a* may apply the received first time offset to the first data signal to generate a first time aligned data signal of the first sensor node 104*a*. The reference node 106 receives the data signal as well. In some embodiments, the first sensor node 104*a* generates the first time aligned data signal by applying a "true time delay" using its DSP 206 to the first data signal.

In a third example 520 of FIG. 5C, the sensor nodes 104*a*-104*n* synchronize their local clocks based on the received time offsets so that when the data signal is received at the sensor nodes, the data signals of the sensor nodes 104*a*-104*n* are time aligned. For example, the first sensor node 104*a* and the reference node 106 transmit the first timestamp and the reference timestamp, respectively, to the central processing node 108. The central processing node 108 computes the first time offset of the first sensor node 104*a* based on the first timestamp and the reference timestamp (e.g., as described above at least with reference to FIG. 5A) and transmits the first time offset to the first sensor node 104*a*. The first sensor node 104*a* synchronizes its local clock based on the received first time offset such that clock of the first sensor node 104*a* is now synchronized with the clock of the reference node 106. When the sensor nodes receive a data signal (e.g., a response to a probe signal transmitted by the sensor nodes, the response being reflected off an object such as an aircraft), the timestamps (of the receipt of the data signal) recorded at the sensor nodes 104*a*-104*n* are the same as the reference node 106 since the clocks are synchronized to the reference node 106, and therefore, the data signals of the sensor nodes 104*a*-104*n* are time aligned. For example, when the first sensor node 104*a* and the reference node 106 receive the data signal, the timestamp (of the receipt of the data signal) recorded at the first sensor node 104*a* is the same as the timestamp (of the receipt of the data signal) recorded at the reference node 106 since the clock of the first sensor node 104*a* is synchronized to the reference node 106, and therefore, the data signal of the first sensor node 104*a* is time aligned with the data signal of the reference node 106.

While the foregoing paragraphs describe the operations being performed with respect to a single sensor node (e.g., the first sensor node 104*a*), the operations 402-408 and the operations described with reference to FIGS. 5A-5C may be performed for all sensor nodes 104*a*-104*n* in the distributed system 100 that have the capability to receive waveforms. Further, while the foregoing paragraphs describe the operations (e.g., time synchronization) being performed by a single sensor node, such as the central processing node 108, the operations may be performed by another sensor node, such as the reference node 106, or by more than one sensor node. For example, any number of sensor nodes may perform the time synchronization or time alignment of data signals in the case where processing is done in a distributed way. Furthermore, the time synchronization (e.g., operations 402-406 for computing the time offsets) can be performed on a scheduled basis, prior to transmitting a probe signal, or prior to receiving the data signal.

Figure 6:
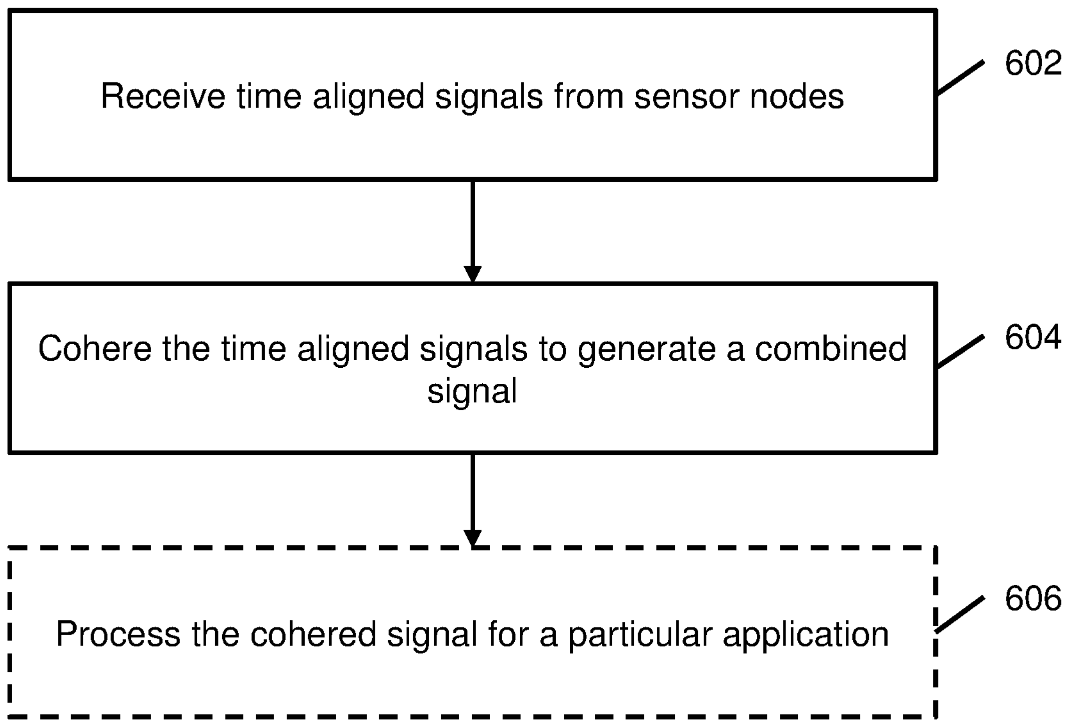
FIG. 6 shows a flowchart of a method for cohering time aligned data signals from sensor nodes of a distributed system of FIG. 1, consistent with various embodiments.

FIG. 6 shows a flowchart of a method 600 for cohering time aligned data signals from sensor nodes of a distributed system of FIG. 1, consistent with various embodiments. In some embodiments, the method 600 may be implemented using the central processing node 108 of the distributed system 100. In an operation 602, the time aligned data signals of the sensor nodes 104*a*-104*n* are obtained. In some embodiments, the time aligned data signals are generated as described at least with reference to FIGS. 4 and 5A-5C above. For example, the central processing node 108 may generate the time aligned signals of the sensor nodes 104*a*-104*n* based on the corresponding time offsets of the sensor nodes 104*a*-104*n* or obtain the time aligned signals from the sensor nodes 104*a*-104*n*.

In an operation 604, the time aligned signals are cohered (e.g., added) to generate a combined signal. The combined signal may have a coherent gain such that power level of the combined signal may be a function of the individual time aligned signals being combined. For example, the power level of the cohered signal is a sum of the power levels of the individual time aligned signals of the different sensor nodes. In another example, the power level of the cohered signal is greater than the power levels of any of the individual time aligned signals of the different sensor nodes. In some embodiments, the cohering of the time aligned data signals is performed by the central processing node 108. In some embodiments, the sensor nodes perform the cohering of the time aligned signals (e.g., in a daisy chain format), instead of all sensor nodes 104*a*-104*n* sending their time aligned signals to a central processing node 108 for combining of all the time aligned signals. For example, a "binary" tree algorithm may be used for combining, where a the first sensor node 104*a* combines the time aligned signal with the second sensor node 104*b* to generate a first cohered signal, a third sensor node 104*c* combines with a fourth sensor node 104*a*-104*n* to produce a second cohered signal, and then the second sensor node 104*b* shares the first cohered signal with the fourth sensor node 104*a*-104*n* and the fourth sensor node 104*a*-104*n* combines the first cohered signal with the second cohered signal to generate a third cohered signal and so on.

In an operation 606, the cohered or the combined signal may then be processed for a desired application. For example, the combined signal may be used in a radar application to signals emitted from an object (e.g., aircraft) for measuring one or more parameters related to the object (e.g., distance or speed of the aircraft). The processing of the cohered signal may be performed by the distributed system 100 or by a third-party system in which case the cohered signal is provided as an input to the third-party system.

Figure 7:
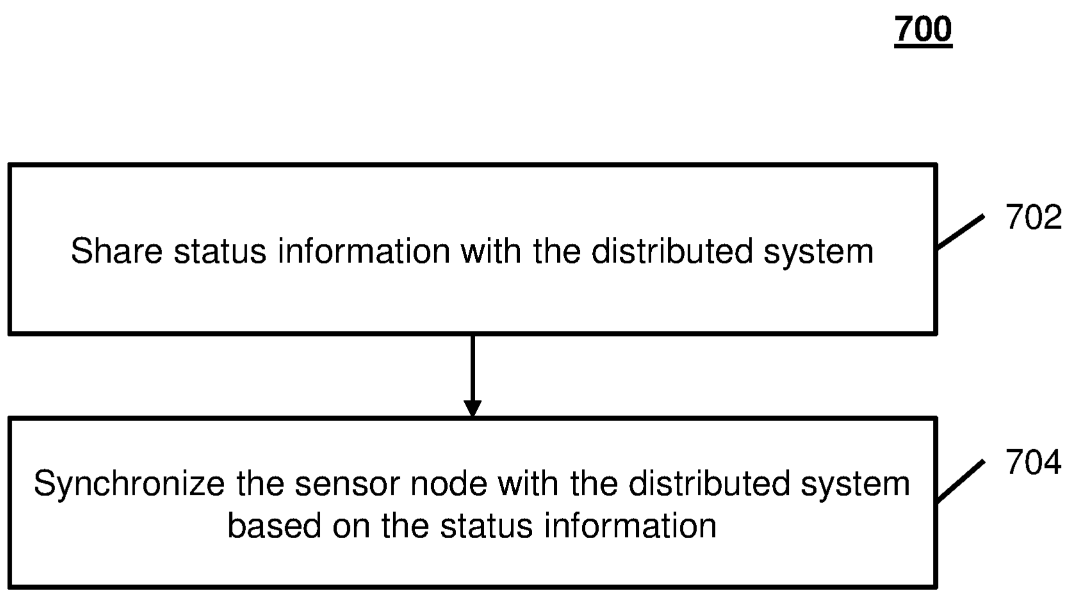
FIG. 7 shows a flowchart of a method for synchronizing sensor nodes in a distributed system of FIG. 1, consistent with various embodiments.

FIG. 7 shows a flowchart of a method 700 for synchronizing sensor nodes in a distributed system, consistent with various embodiments. In an operation 702 a sensor node shares its status information with the distributed system 100 (e.g., one or more other sensor nodes 104*a*-104*n*, the reference node 106 or the central processing node 108). For example, the status information may include at least one of a temperature in an environment of the sensor node; a location (such as determined by GPS) of the sensor node; calibration metrics such as phase and amplitude offsets of the RF components (or optical components in the case of optics); or a timestamp of an occurrence of an event such as (a) a receipt of a signal (e.g., calibration signal, GPS signal, or any other known waveform) or (b) a receipt of a request for local timestamp of the sensor node.

In an operation 704, the sensor nodes 104*a*-104*n* are synchronized based on the status information. For example, in embodiments where the sensor nodes 104*a*-104*n* are implemented using factory-calibrated atomic clocks, a sensor node of the distributed system 100 (e.g., a central processing node 108) sends a request to each of the sensor nodes 104*a*-104*n*, including a reference node 106 of the distributed system 100, for a local timestamp of the corresponding sensor node and obtains a response including the local timestamp (e.g., a time at which the request is received at the corresponding sensor node). The distributed system 100 (e.g., a central processing node 108) synchronizes a first sensor node 104*a* with the reference node 106 by computing a time offset between a reference timestamp of the reference node 106 (e.g., a time at which the reference node 106 received the request for local timestamp) and a first timestamp of the first sensor node 104*a* (e.g., a time at which the first sensor node 104*a* received the request for local timestamp). In some embodiments, the distributed system 100 synchronizes the first sensor node 104*a* as described at least with reference to FIGS. 5A-5C.

In another example where the distributed system 100 is configured to synchronize the sensor nodes 104*a*-104*n* using a calibration signal, the distributed system 100 synchronizes each of the sensor nodes 104*a*-104*n* with a reference node 106 of the distributed system 100 by computing a time offset between a timestamp of a receipt of a calibration signal at a reference node 106 of the distributed system 100 and a timestamp of receipt of the calibration signal at the corresponding sensor node, as described at least with reference to FIGS. 3-5.

In some embodiments, after synchronizing the sensor nodes 104*a*-104*n*, the time aligned signals are cohered (e.g., added) to generate a combined signal, which may be further processed for a desired application, as described at least with reference to FIG. 6 above.

Figure 8:
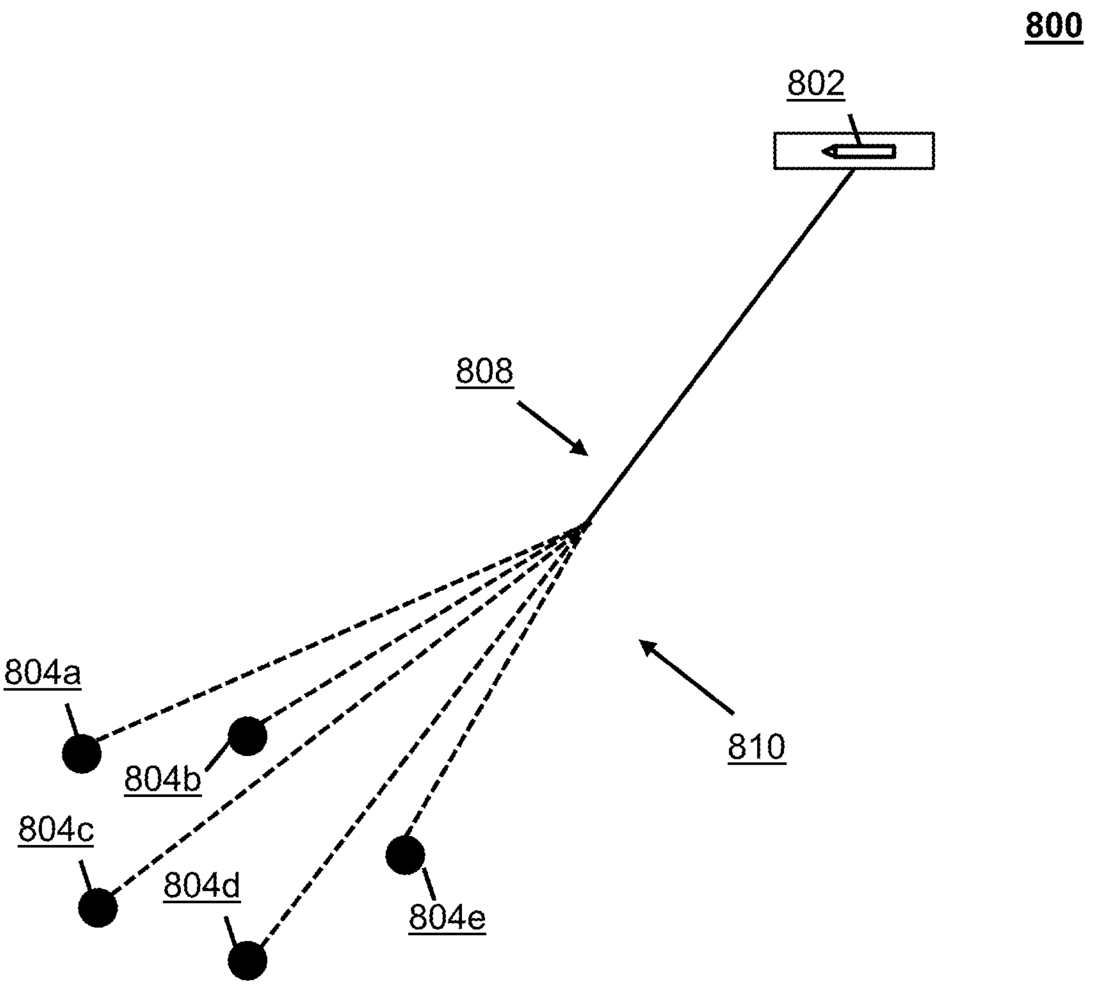
FIG. 8 is a block diagram of a radar system implemented using a distributed system of FIG. 1, consistent with various embodiments.

FIG. 8 is a block diagram of a radar system 800 implemented using a distributed system of FIG. 1, consistent with various embodiments. The radar system 800 includes a number of sensor nodes (e.g., sensor nodes 804*a*, 804*b*, 804*c*, 804*d* and 804*c*) that are configured to facilitate surveillance of a moving object (e.g., detection of an aircraft 802). In some embodiments, the sensor nodes 804*a*-804*e* are similar to the sensor nodes 104*a*-104*n* of the distributed system 100. In some embodiments, one of the sensor nodes 804*a*-804*e* may be designated as a reference node and a central processing node. In some embodiments, all the sensor nodes 804*a*-804*e* are configured as transmit and receive sensor nodes. The sensor nodes 804*a*-804*e* may be time synchronized as described at least with reference to FIGS. 4 and 5A-5C above. Further, the time aligned signals may be cohered as described at least with reference to FIG. 6 above. The radar system 800 may be configured to work in a wide range of frequencies (e.g., 50 MHz to 36 GHZ).

The sensor nodes 804*a*-804*c* are configured to transmit a probe signal 808 in a beamforming pattern. The signals reflected from the aircraft 802 may be received by the sensor nodes as data signals 810. The data signals 810 are time aligned, cohered, and processed to determine one or more parameters of the aircraft 802 (e.g., distance or speed of the aircraft).

While FIG. 8 shows a single cluster of sensor nodes 804*a*-804*e*, the radar system 800 may have several clusters. In some embodiments, each black dot in FIG. 8 may be a cluster of sensor nodes. For example, the black dot 804*a* can be a first cluster, the block dot 804*b* can be a second cluster and so on each of which includes several sensor nodes. In some embodiments, such a configuration enables detection of a moving object at ultra-long range and hypersonic speeds. In some embodiments, the sensor nodes or clusters may be spread over a few hundred meters.

The distributed system 100 may also be implemented as a mobile sensor array system. For example, the sensor nodes 104*a*-104*n* may be designed as mobile sensor nodes that is battery powered, solar powered, etc. and may be installed in an automobile, an unmanned aerial vehicle (UAV), or other mobile devices.

While FIG. 8 describes implementation of the distributed system 100 as a radar system, the distributed system 100 may also be implemented as a sonar system to facilitate surveillance of objects moving underwater (e.g., a submarine). For example, the sensor nodes 104*a*-104*n* may be configured as hydrophone sensor nodes, which can be installed as buoys or as mobile hydrophones (e.g., in submarines). The hydrophone sensor nodes may be associated with above water components that communicate with satellites and has GPS capability.

In yet another example, the distributed system 100 may be implemented for oil and gas and mining industry to facilitate detection of oil (or any other energy) and metals. For example, the sensor nodes 104*a*-104*n* may be configured to work with seismic or acoustic waveforms and the cohered signals may be used to detect oil (or any other energy) and metals.

In some embodiments, the various components or modules illustrated in the Figures or described in the foregoing paragraphs may include one or more computing devices that are programmed to perform the functions described herein. The computing devices may include one or more electronic storages, one or more physical processors programmed with one or more computer program instructions, and/or other components. The computing devices may include communication lines or ports to enable the exchange of information within a network or other computing platforms via wired or wireless techniques (e.g., Ethernet, fiber optics, coaxial cable, Wi-Fi, Bluetooth, near field communication, or other technologies). The computing devices may include a plurality of hardware, software, and/or firmware components operating together. For example, the computing devices may be implemented by a cloud of computing platforms operating together as the computing devices. Cloud components may include control circuitry configured to perform the various operations needed to implement the disclosed embodiments. Cloud components may include cloud-based storage circuitry configured to electronically store information. Cloud components may also include cloud-based input/output circuitry configured to display information.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein. The processors may be programmed to execute computer program instructions by software; hardware; firmware; some combination of software, hardware, or firmware; and/or other mechanisms for configuring processing capabilities on the processors.

It should be appreciated that the description of the functionality provided by the components or modules described herein is for illustrative purposes, and is not intended to be limiting, as any of the components or modules may provide more or less functionality than is described. For example, one or more of the components or modules may be eliminated, and some or all of its functionality may be provided by other ones of the components or modules. As another example, additional components or modules may be programmed to perform some or all of the functionality attributed herein to one of the components or modules.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

Embodiment 1. A method for synchronizing sensor nodes in a phased array system, the method comprising: receiving a calibration signal at each of multiple sensor nodes; determining a timestamp of a receipt of the calibration signal at each of the multiple sensor nodes; determining, for each of the multiple sensor nodes, a time offset between a timestamp of a receipt of the calibration signal at a reference node of the phased array system and the timestamp of the corresponding sensor node; and synchronizing each of the multiple sensor nodes based on the time offset of the corresponding sensor node to time align data signals received by the multiple sensor nodes.

Embodiment 2. The method of embodiment 1, wherein synchronizing each of the multiple sensor nodes includes: equalizing the data signals based on the time offsets of the multiple sensor nodes to generate time aligned data signals, wherein the equalizing includes applying a first time offset associated with a first sensor node of the multiple sensor nodes to a first data signal received by the first sensor node to generate a first time aligned data signal that is aligned in time with a data signal received by the reference node.

Embodiment 3. The method of any of embodiments 1-2, wherein equalizing the data signals further includes: adjusting one or more of a phase or amplitude of associated with the first data signal based on one or more of a phase or amplitude of the data signals associated with remaining of the multiple sensor nodes to generate the first time aligned data signal.

Embodiment 4. The method of any of embodiments 1-3, wherein determining the time offset includes: receiving, at the reference node, the timestamps from the multiple sensor nodes, wherein the timestamps include a first timestamp of a receipt of the calibration signal at a first sensor node of the multiple sensor nodes; and computing, at the reference node, the time offsets based on the timestamps of the multiple sensor nodes, wherein the time offsets include a first time offset determined as a difference between the first timestamp and the timestamp of a receipt of the calibration signal at the reference node.

Embodiment 5. The method of any of embodiments 1-4 further comprising: storing, at a storage device associated with the reference node, the first time offset.

Embodiment 6. The method of any of embodiments 1-5, wherein the synchronizing includes: receiving, at the reference node, a first data signal received by the first sensor node; retrieving the first time offset from the storage device; and applying the first time offset to the first data signal to generate a first time aligned data signal that is aligned in time with a data signal received by the reference node.

Embodiment 7. The method of any of embodiments 1-4 further comprising: transmitting, from the reference node, the first time offset to the first sensor node.

Embodiment 8. The method of any of embodiments 1-7 further comprising: adjusting, by the first sensor node, a clock of the first sensor node based on the first time offset to synchronize the clock of the first sensor node with a clock of the reference node.

Embodiment 9. The method of any of embodiments 1-8 further comprising: receiving a first data signal at the first sensor node and the reference node, wherein a timestamp of a receipt of the first data signal at the reference node and the timestamp of a receipt of the first data signal at the first sensor node are the same.

Embodiment 10. The method of any of embodiments 1-9 further comprising: receiving a first data signal at the first sensor node and the reference node; and applying, at the first sensor node, the first time offset to the first data signal to generate a first time aligned data signal that is aligned in time with the first data signal received by the reference node.

Embodiment 11. The method of any of embodiments 1-10, wherein determining the time offset includes: determining a time difference in arrival of the calibration signal at the multiple sensor nodes, wherein the time difference in arrival is indicative of a difference between a time at which the calibration signal arrived at a specific sensor node of the multiple sensor nodes and a time at which the calibration signal arrived at the reference node; and determining the time offset for the specific sensor node based on the time difference in arrival.

Embodiment 12. The method of any of embodiments 1-11, wherein the time difference in arrival is determined based on location information of the specific sensor node, the reference node and a transmitter node transmitting the calibration signal.

Embodiment 13. The method of any of embodiments 1-12, wherein receiving the calibration signal at the multiple sensor nodes includes: receiving the calibration signal at the multiple sensor nodes that are co-located, wherein the sensor nodes are considered to be co-located in an event the sensor nodes are within a specified proximity of each other.

Embodiment 14. The method of any of embodiments 1-13, wherein receiving the calibration signal at the multiple sensor nodes includes: receiving the calibration signal at the sensor nodes from a transmitter that is co-located with the sensor nodes.

Embodiment 15. The method of any of embodiments 1-14, wherein receiving the calibration signal at the multiple sensor nodes includes: receiving the calibration signal at the sensor nodes from a transmitter that is beyond a specified proximity of the sensor nodes.

Embodiment 16. The method of any of embodiments 1-15, wherein the calibration signal includes at least one of a pulse through Ethernet, a global positioning satellite (GPS) signal, Quasar waveform, an RF signal, an acoustic signal, or seismic signal.

Embodiment 17. The method of any of embodiments 1-16, wherein determining the timestamp of a receipt of the calibration signal at the multiple sensor nodes includes: compressing the calibration signal to a single point of time at a first sensor node of the multiple sensor nodes, wherein the single point of time is determined as a first timestamp of a receipt of the calibration signal at the first sensor node.

Embodiment 18. The method of any of embodiments 1-17, wherein the calibration signal is compressed to the single point in time using a matched filter.

Embodiment 19. The method of any of embodiments 1-18, wherein synchronizing the multiple sensor nodes includes: synchronizing the multiple sensor nodes based on a specified schedule.

Embodiment 20. The method of any of embodiments 1-19, wherein synchronizing the multiple sensor nodes includes: synchronizing the sensor nodes prior to (a) transmitting an input signal from the sensor nodes, or (b) receiving a response signal to the input signal at the sensor nodes.

Embodiment 21. The method of any of embodiments 1-20 further comprising: cohering time aligned data signals of the multiple sensor nodes to generate a combined signal, the combined signal having a power level greater than a power level of any of the sensor nodes.

Embodiment 22. The method of any of embodiments 1-21 further comprising: performing signal intelligence processing on the combined signal to determine one or more parameters associated with an object for which the phased array system is used.

Embodiment 23. The method of any of embodiments 1-22 further comprising: cohering time aligned data signals received from a first set of sensor nodes of a first cluster with time aligned data signals received from a second set of sensor nodes of a second cluster to generate a combined signal.

What is claimed is:

1. A method for synchronizing sensor nodes in a sensor array system, the method comprising:

sharing, by each of multiple sensor nodes, status information of the corresponding sensor node with the sensor array system;

synchronizing the multiple sensor nodes based on the status information of the multiple sensor nodes to synchronize data signals received or transmitted by the multiple sensor nodes;

cohering synchronized data signals of the multiple sensor nodes to generate a combined signal, the combined signal having a power level greater than a power level of any of the sensor nodes; and performing signal intelligence processing on the combined signal to determine one or more parameters associated with an object for which the sensor array system is used.

2. The method of claim 1, wherein the status information includes a local timestamp of an occurrence of an event at the corresponding sensor node.

3. The method of claim 2, wherein the event includes a receipt of a request for a timestamp at the corresponding sensor node.

4. The method of claim 2, wherein the event includes a receipt of a calibration signal at the corresponding sensor node.

5. A method for synchronizing sensor nodes in a sensor array system, the method comprising:

sharing, by each of multiple sensor nodes, status information of the corresponding sensor node with the sensor array system, the status information including a local timestamp of an occurrence of an event at the corresponding sensor node; and synchronizing the multiple sensor nodes based on the status information of the multiple sensor nodes to synchronize data signals received or transmitted by the multiple sensor nodes, the synchronizing comprising:

determining, for each of the multiple sensor nodes, a time offset between a timestamp of a receipt of the calibration signal at a reference node of the sensor array system and the timestamp of the receipt of the calibration signal at the corresponding sensor node; and synchronizing each of the multiple sensor nodes based on the time offset of the corresponding sensor node to time align the data signals received by the multiple sensor nodes.

6. The method of claim 5, wherein synchronizing each of the multiple sensor nodes includes:

equalizing the data signals based on the time offsets of the multiple sensor nodes to generate time aligned data signals, wherein the equalizing includes applying a first time offset associated with a first sensor node of the multiple sensor nodes to a first data signal received by the first sensor node to generate a first time aligned data signal that is aligned in time with a data signal received by the reference node.

7. The method of claim 6, wherein equalizing the data signals further includes:

adjusting one or more of a phase or amplitude of associated with the first data signal based on one or more of a phase or amplitude of the data signals associated with remaining of the multiple sensor nodes to generate the first time aligned data signal.

8. The method of claim 5, wherein determining the time offset includes:

receiving, at the reference node, timestamps from the multiple sensor nodes, wherein the timestamps include a first timestamp of a receipt of the calibration signal at a first sensor node of the multiple sensor nodes; and computing, at the reference node, the time offsets based on the timestamps of the multiple sensor nodes, wherein the time offsets include a first time offset determined as a difference between the first timestamp and the timestamp of a receipt of the calibration signal at the reference node.

9. The method of claim 8 further comprising:

storing, at a storage device associated with the reference node, the first time offset.

10. The method of claim 9, wherein the synchronizing includes:

receiving, at the reference node, a first data signal received by the first sensor node;

retrieving the first time offset from the storage device; and applying the first time offset to the first data signal to generate a first time aligned data signal that is aligned in time with a data signal received by the reference node.

11. The method of claim 9 further comprising:

transmitting, from the reference node, the first time offset to the first sensor node.

12. The method of claim 11 further comprising:

adjusting, by the first sensor node, a clock of the first sensor node based on the first time offset to synchronize the clock of the first sensor node with a clock of the reference node.

13. The method of claim 12 further comprising:

receiving a first data signal at the first sensor node and the reference node, wherein a timestamp of a receipt of the first data signal at the reference node and the timestamp of a receipt of the first data signal at the first sensor node are the same.

14. The method of claim 11 further comprising:

receiving a first data signal at the first sensor node and the reference node; and applying, at the first sensor node, the first time offset to the first data signal to generate a first time aligned data signal that is aligned in time with the first data signal received by the reference node.

15. The method of claim 5, wherein determining the time offset includes:

determining a time difference in arrival of the calibration signal at the multiple sensor nodes, wherein the time difference in arrival is indicative of a difference between a time at which the calibration signal arrived at a specific sensor node of the multiple sensor nodes and a time at which the calibration signal arrived at the reference node; and determining the time offset for the specific sensor node based on the time difference in arrival.

16. The method of claim 15, wherein the time difference in arrival is determined based on location information of the specific sensor node, the reference node and a transmitter node transmitting the calibration signal.

17. The method of claim 5, wherein determining the time offset includes:

receiving the calibration signal at the multiple sensor nodes.

18. The method of claim 17, wherein receiving the calibration signal at the multiple sensor nodes includes:

receiving the calibration signal at the multiple sensor nodes that are co-located, wherein the sensor nodes are considered to be co-located in an event the sensor nodes are within a specified proximity of each other.

19. The method of claim 17, wherein receiving the calibration signal at the multiple sensor nodes includes:

receiving the calibration signal at the sensor nodes from a transmitter that is co-located with the sensor nodes.

20. The method of claim 17, wherein receiving the calibration signal at the multiple sensor nodes includes:

receiving the calibration signal at the sensor nodes from a transmitter that is beyond a specified proximity of the sensor nodes.

21. The method of claim 17, wherein the calibration signal includes at least one of a pulse through Ethernet, a global positioning satellite (GPS) signal, Quasar waveform, an RF signal, an acoustic signal, or seismic signal.

22. The method of claim 5, wherein the timestamp of a receipt of the calibration signal at the multiple sensor nodes is determined by:

compressing the calibration signal to a single point of time at a first sensor node of the multiple sensor nodes, wherein the single point of time is determined as a first timestamp of a receipt of the calibration signal at the first sensor node.

23. The method of claim 22, wherein the calibration signal is compressed to the single point in time using a matched filter.

24. The method of claim 1, wherein synchronizing the multiple sensor nodes includes:

synchronizing the multiple sensor nodes based on a specified schedule.

25. The method of claim 1, wherein synchronizing the multiple sensor nodes includes:

synchronizing the sensor nodes prior to (a) transmitting an input signal from the sensor nodes, or (b) receiving a response signal to the input signal at the sensor nodes.

26. The method of claim 1, wherein synchronizing the multiple sensor nodes includes:

synchronizing the data signals received or transmitted by the multiple sensor nodes in a radar system to detect an object in atmosphere.

27. The method of claim 1, wherein synchronizing the multiple sensor nodes includes:

synchronizing the data signals received or transmitted by the multiple sensor nodes in a sonar system to detect an object underwater.

28. A system for synchronizing sensor nodes in a phased array system, the system comprising:

multiple sensor nodes that are configured to receive a calibration signal, wherein the multiple sensor nodes include a first sensor node and a second sensor node;

a reference node that is configured to receive the calibration signal; and a central processing node that is configured to facilitate time synchronization of the multiple sensor nodes by:

computing a first time offset between a timestamp of a receipt of the calibration signal at the reference node and a first timestamp of a receipt of the calibration signal at the first sensor node, computing a second time offset between the timestamp of a receipt of the calibration signal at the reference node and a second timestamp of a receipt of the calibration signal at the second sensor node, and causing time aligning of data signals received by the first sensor node and the second sensor node based on the first time offset and the second time offset, respectively, wherein the central processing node is further configured to receive the timestamp from the reference node, the first timestamp from the first sensor node and the second timestamp from the second sensor node; and store the timestamp, the first timestamp and the second timestamp at a storage device associated with the central processing node.

29. The system of claim 28, wherein the central processing node includes a software-defined radio that is configured to cause time aligning of the data signals received by the first sensor node and the second sensor node.

30. The system of claim 28, wherein the central processing node is configured to:

receive a first data signal received by the first sensor node and the reference node;

retrieve the first time offset from the storage device; and apply the first time offset to the first data signal to generate a first time aligned data signal that is aligned in time with the first data signal received by the reference node.

31. A system for synchronizing sensor nodes in a phased array system, the system comprising:

multiple sensor nodes that are configured to receive a calibration signal, wherein the multiple sensor nodes include a first sensor node and a second sensor node;

a reference node that is configured to receive the calibration signal; and a central processing node that is configured to facilitate time synchronization of the multiple sensor nodes by:

computing a first time offset between a timestamp of a receipt of the calibration signal at the reference node and a first timestamp of a receipt of the calibration signal at the first sensor node, computing a second time offset between the timestamp of a receipt of the calibration signal at the reference node and a second timestamp of a receipt of the calibration signal at the second sensor node, and causing time aligning of data signals received by the first sensor node and the second sensor node based on the first time offset and the second time offset, respectively, wherein the central processing node is further configured to transmit the first time offset to the first sensor node.

32. The system of claim 31, wherein the first sensor node is configured to:

adjust a clock of the first sensor node based on the first time offset to synchronize the clock of the first sensor node with a clock of the reference node causing a timestamp of a receipt of a first data signal at the reference node and a timestamp of a receipt of the first data signal at the first sensor node to be the same.

33. The system of claim 32, wherein the first sensor node includes a software-defined radio that is configured to adjust the clock of the first sensor node.

34. The system of claim 31, wherein the first sensor node is configured to:

receive a first data signal; and apply the first time offset to the first data signal to generate a first time aligned data signal that is aligned in time with the first data signal received by the reference node.

35. A system for synchronizing sensor nodes in a phased array system, the system comprising:

multiple sensor nodes that are configured to receive a calibration signal, wherein the multiple sensor nodes include a first sensor node and a second sensor node;

a reference node that is configured to receive the calibration signal; and a central processing node that is configured to facilitate time synchronization of the multiple sensor nodes by:

computing a first time offset between a timestamp of a receipt of the calibration signal at the reference node and a first timestamp of a receipt of the calibration signal at the first sensor node, computing a second time offset between the timestamp of a receipt of the calibration signal at the reference node and a second timestamp of a receipt of the calibration signal at the second sensor node, and causing time aligning of data signals received by the first sensor node and the second sensor node based on the first time offset and the second time offset, respectively, wherein the first sensor node is configured to receive a first data signal and apply the first time offset to the first data signal to generate a first time aligned data signal that is aligned in time with the first data signal received by the reference node, wherein the first sensor node includes a software-defined radio that is configured to generate the first time aligned data signal that is aligned in time with the first data signal received by the reference node.

36. The system of claim 28, wherein the central processing node and the reference node are the same sensor node.

37. A system for synchronizing sensor nodes in a phased array system, the system comprising:

multiple sensor nodes that are configured to receive a calibration signal, wherein the multiple sensor nodes include a first sensor node and a second sensor node;

a reference node that is configured to receive the calibration signal, wherein the reference node is co-located with the multiple sensor nodes, wherein the reference node is considered to be co-located with the multiple sensor nodes in an event the multiple sensor nodes and the reference node are within a specified proximity of each other; and a central processing node that is configured to facilitate time synchronization of the multiple sensor nodes by:

computing a first time offset between a timestamp of a receipt of the calibration signal at the reference node and a first timestamp of a receipt of the calibration signal at the first sensor node, computing a second time offset between the timestamp of a receipt of the calibration signal at the reference node and a second timestamp of a receipt of the calibration signal at the second sensor node, and causing time aligning of data signals received by the first sensor node and the second sensor node based on the first time offset and the second time offset, respectively.

38. The system of claim 31 further comprising:

a transmitter node to transmit the calibration signal.

39. The system of claim 38, wherein the transmitter node is co-located with the multiple sensor nodes.

40. The system of claim 38, wherein the transmitter node is located outside of a specified proximity of the multiple sensor nodes.

41. A system for synchronizing sensor nodes in a phased array system, the system comprising:

multiple sensor nodes that are configured to receive a calibration signal, wherein the multiple sensor nodes include a first sensor node and a second sensor node;

a reference node that is configured to receive the calibration signal; and a central processing node that is configured to facilitate time synchronization of the multiple sensor nodes by:

computing a first time offset between a timestamp of a receipt of the calibration signal at the reference node and a first timestamp of a receipt of the calibration signal at the first sensor node, computing a second time offset between the timestamp of a receipt of the calibration signal at the reference node and a second timestamp of a receipt of the calibration signal at the second sensor node, and causing time aligning of data signals received by the first sensor node and the second sensor node based on the first time offset and the second time offset, respectively, wherein the central processing node is further configured to:

determine a time difference in arrival of the calibration signal at the first sensor node, wherein the time difference in arrival is indicative of a difference between a time at which the calibration signal arrived at the first sensor node and a time at which the calibration signal arrived at the reference node; and determine the time offset for the first sensor node based on the time difference in arrival.

42. The system of claim 41, wherein the central processing node is configured to:

determine the time difference in arrival based on location information of the first sensor node, the reference node and a transmitter node transmitting the calibration signal.

43. The system of claim 42, wherein the location information of the first sensor node, the reference node and the transmitter node are obtained using a corresponding software defined radio in each of the first sensor node, the reference node and the transmitter node.

44. The system of claim 31, wherein the central processing node is configured to:

cohere time aligned data signals of the multiple sensor nodes to generate a combined signal, the combined signal having a power level greater than a power level of any of the multiple sensor nodes.

45. A system for synchronizing sensor nodes in a phased array system, the system comprising:

multiple sensor nodes that are configured to receive a calibration signal, wherein the multiple sensor nodes include a first sensor node and a second sensor node;

a reference node that is configured to receive the calibration signal; and a central processing node that is configured to facilitate time synchronization of the multiple sensor nodes by:

computing a first time offset between a timestamp of a receipt of the calibration signal at the reference node and a first timestamp of a receipt of the calibration signal at the first sensor node, computing a second time offset between the timestamp of a receipt of the calibration signal at the reference node and a second timestamp of a receipt of the calibration signal at the second sensor node, causing time aligning of data signals received by the first sensor node and the second sensor node based on the first time offset and the second time offset, respectively, and causing signal intelligence processing on the combined signal to determine one or more parameters associated with an object for which the phased array system is used, wherein the central processing node is further configured to cohere time aligned data signals of the multiple sensor nodes to generate a combined signal, the combined signal having a power level greater than a power level of any of the multiple sensor nodes.

* * * * *